Dec. 4, 1973    P. ROY ET AL    3,776,831
DEVICE FOR MEASURING OXYGEN
ACTIVITY IN LIQUID SODIUM
Filed Nov. 15, 1972

United States Patent Office 3,776,831
Patented Dec. 4, 1973

3,776,831
DEVICE FOR MEASURING OXYGEN ACTIVITY IN LIQUID SODIUM
Prodyot Roy, Saratoga, and Robert S. Young, San Jose, Calif., assignors to the United States of America as represented by the United States Atomic Energy Commission
Filed Nov. 15, 1972, Ser. No. 306,976
Int. Cl. G01n 27/46
U.S. Cl. 204—195 S                   7 Claims

ABSTRACT OF THE DISCLOSURE

A composite ceramic electrolyte in a configuration (such as a closed end tube or a plate) suitable to separate liquid sodium from a reference electrode with a high impedance voltmeter connected to measure EMF between the sodium and the reference electrode as a measure of oxygen activity in the sodium. The composite electrolyte consists of zirconia-calcia with a bonded layer of thoria-yttria. The device is used with a gaseous reference electrode on the zirconia-calcia side and liquid sodium on the thoria-yttria side of the electrolyte.

BACKGROUND OF THE INVENTION

The invention described herein was made in the course of, or under, Contract No. AT(04-3)-189, Project Agreement No. 15, with the United States Atomic Energy Commission.

This invention relates to measuring oxygen activity in liquid metal coolant, and more particularly to device for measuring oxygen activity in liquid sodium at high temperature utilizing a composite ceramic electrolyte with a gas reference electrode.

Measurement and control of oxygen impurity in liquid sodium is important in the operation of sodium cooled reactors and systems used for testing materials compatibility and sodium components. Corrosion rates of materials of construction, design properties, changes of the materials, and deposition of mass transfer products, all having an effect on economics of construction and safe operation of a sodium cooled reactor and on lifetime of components, are a direct function of the oxygen content of the sodium.

Devices currently used to indicate oxygen in sodium during system operation lack in precision or consistency of operation. These include plugging indicators with a determination bandwidth of about 10 p.p.m., and electrochemical cells that are precise but difficult to calibrate and do not maintain their calibration, and have limited life in sodium.

Electrochemical cells previously used for measuring oxygen activities in liquid sodium have the following characteristics:

(1) These prior cells generally consist of a thin wall solid ceramic electrolyte tube (thoria-15% yttria fired to high density) separating liquid sodium from an internal electrode (reference electrode) contacting a conducting surface on the inside of the electrolyte tube. The EMF measured between the reference electrode and the liquid sodium is a measure of the oxygen activity in the sodium.

(2) The ceramic electrolytes now available commercially (thO$_2$-15% Y$_2$O$_3$) have high impurity levels and are not compatible with liquid sodium, hence short lived, above 500° C. Recent laboratory improvements in lowering impurity levels by vacuum treatment of raw materials or firing formed tubes in a hydrogen atmosphere at high temperature indicate an improved compatibility to sodium up to 700° to 800° C.

(3) Thoria-yttria ceramic tubes for electrolytes are highly susceptible to breakage by thermal gradients and thermal shock which occur during transients in sodium systems.

(4) At low temperatures (less than 800° C.) solid oxides do not function as a suitable reference electrode. The slow diffusion of oxygen in the oxides at low temperatures causes the cells to be irreversible. A necessary condition for cell operation is that the oxygen reactions be reversible.

(5) The use of a gaseous reference electrode such as oxygen or air is feasible at 700 to 800° C. to obtain a readily reversible reference electrode reaction. However, the currently available thoria-yttria ceramic electrolytes are not compatible with liquid sodium at these high temperatures. Furthermore, at high oxygen potential (e.g., air or oxygen gas at 1 atm.) electronic conductivity of the thioria-yttria becomes significant and the cell is unsuitable for accurate measurements. Hence, although these prior high purity ceramic electrolytes show improved compatibility to sodium, they cannot be used with reference electrodes.

SUMMARY OF THE INVENTION

This invention overcomes the above-mentioned disadvantages of the prior art and is directed to a composite ceramic electrolyte tube, plate, or other suitable configuration, consisting of zirconia-calcia (such as ZrO$_2$-9 to 15% CaO) with an outer layer of high purity thoria-yttria (such as thO$_2$-7.5% Y$_2$O$_3$) contacting the liquid sodium, used with a gaseous reference electrode (such as air or oxygen). For example, the zirconia-calcia is about 1 mm. thick with a bonded layer of thoria-yttria about 0.5 mm. thick.

Therefore, it is an object of this invention to provide a device for measuring oxygen activity in liquid sodium.

A further object of the invention is to provide a device for measuring oxygen activity in liquid sodium using composite ceramic electrolyte.

Another object of the invention is to provide a composite ceramic electrolyte tube, plate, or other suitable configuration consisting of zirconia-calcia with a layer of high purity thoria-yttria.

Other objects of the invention will become readily apparent to those skilled in the art from the following description and accompanying drawings.

DESCRIPTION OF THE INVENTION

The invention consists of a composite ceramic electrolyte in a configuration suitable to separate liquid sodium from a reference electrode, with a high impedance voltmeter connected to measure EMF between the sodium and the reference electrode as a measure of oxygen activity in the sodium. The composite electrolyte consisting of zirconia-calcia of about 1 mm. thick, for example, with a bonded layer of thoria-yttria about 0.5 mm. thick, for example. The device is used with a gaseous reference electrode on the zirconia-calcia side and liquid sodium on the thoria-yttria side of the electrolyte. The composition of the inventive zirconia-calcia:thoria-yttria composite ceramic electrolyte is ZrO$_2$-9 to 15% CaO and thO$_2$-7.5% Y$_2$O$_3$.

The technology for producing zirconia-calcia members, such as tubes or plates, is well established. The material has better thermal shock resistance than thoria-yttria, and it does not exhibit electronic conductivity at high oxygen potentials (e.g., air or oxygen gas).

Two problems associated with the use of zirconia-calcia ceramic in the prior art are overcome by the layer of thoria-yttria separating it from the liquid sodium. These include (1) zirconia-calcia not being compatible with liquid sodium at high temperatures, and (2) zirconia calcia becoming a partial electronic conductor at low oxygen potential (below 10 p.p.m. oxygen), and hence, cannot be used for galvanic measurements.

The inventive combination of the two ceramics functions as follows:

(1) The layer of high purity thoria-yttria as the outer surface of the electrolyte tube protects the zirconia-calcia from reacting with sodium.

(2) Interference by electronic conduction in zirconia-calcia due to low partial pressures of oxygen is eliminated since the thoria-yttria will remain an ionic conductor at concentrations of less than 1 p.p.m. oxygen in sodium.

(3) The inner surface of the tube, for example (zirconia-calcia), will be in equilibrium with the gaseous electrode and the finite thickness of zirconia-calcia will shield the thoria-yttria from exposure to high oxygen potentials and, therefore, eliminate the electronic conduction problem in thoria-yttria.

(4) The composite electrolyte is less prone to breakage by thermal gradient or shock than the single ceramics now in development since the zirconia-calcia as high resistance to these phenomena.

Figure 1:
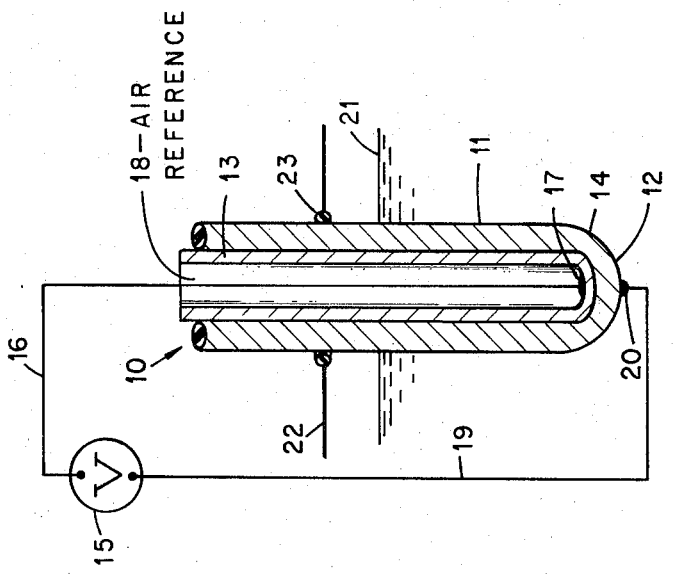
FIG. 1 illustrates, partially in cross-section, the invention in a closed end tube embodiment.

Referring now to the drawings, the FIG. 1 embodiment comprises essentially closed end electrolyte tube indicated, generally at 10 having a wall portion 11 and a hemispherical closed end or bottom portion 12. Tube 10 is composed of an inner layer 13 of zirconia-15% calcia with an outer layer 14 of high purity thoria—7.5% yttria. A high impedance voltmeter 15 is connected on one side by a lead 16 to the interior of tube layer 13 forming a P+ reference electrode 17, which in this embodiment is of the air or oxygen reference type as indicated at 18; voltmeter 15 being connected on the other side via a lead 19 to layer 14 at the closed end portion 12 of tube 10 forming a contact electrode 20 due to layer 14 being at least partially submerged in sodium as indicated by the sodium (Na) level 21, whereby voltmeter 15 measures the EMF between the sodium and the reference electrode as a measure of oxygen activity in the sodium. A metal ceramic freeze seal 22 is positioned about tube 10, at a position above sodium level 21, via an O-ring 23. It is thus seen that the liquid sodium 19 only contacts the thoria-yttria side or layer 14 of the electrolyte tube 10. If desired, the lead 19 from voltmeter 15 can be connected directly to the bottom or end 12 of tube 10.

Figure 2:
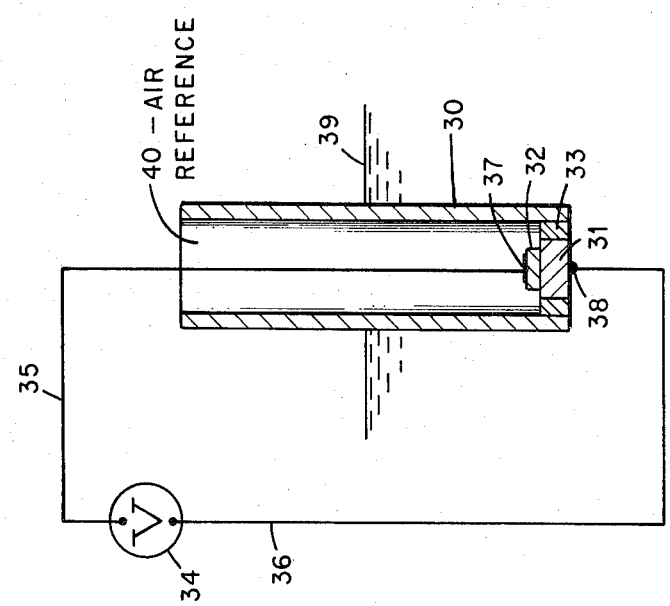
FIG. 2 illustrates the invention in a plate embodiment partially in cross-section.

The FIG. 2 embodiment is directed to a plate-type configuration of the inventive composite ceramic electrolyte and comprises a support tube 30 of nickel, for example, a layer 31 of $ThO_2$-7.5% $Y_2O_3$ is bonded or otherwise secured to a layer 32 of $ZrO_2$-9% $Y_2O_3$, the composite (31–32) being mounted in tube 30 by a metal ceramic seal 33. A high impedance voltmeter 34 is connected via leads 35 and 36 across the composite with lead 35 being connected to a reference electrode on layer 32 indicated at 37 and lead 36 connected to a contact electrode on layer 31 indicated at 38. Tube 30 is partially submerged in liquid sodium as indicated by the sodium level 39. As in the FIG. 1 embodiment, the voltmeter 34 measures the EMF between the sodium and the reference electrode which may be an air or oxygen reference as indicated at 40.

A method for producing the composite ceramic electrolyte tube, for example includes the following:

Slip case, and green fire at low temperature, a zirconia-15% calcia tube with a hemispherical closed end and wall thickness of about 1 mm. Plasma spray co-precipitated high purity thoria-7½% yttria over the outer surface of the tube to a thickness of about 0.5 mm. over the area of the tube necessary to protect it from contact with sodium. Sinter the composite tube in vacuum or hydrogen atmosphere at 2000° C. to approximately 85% of theoretical density. Coat the bottom and inner surfaces of the zirconia-calcia tube with a thin film of gold to define electrode contacts and refire the tube at 700° C. to insure good electrical contact.

Possible variations in fabrication are as follows:

(A) Prepare a zirconia-calcia tube by isostatic pressing, green fire and proceed as in the above method.

(B) Prepare a green composite tube by a combination of slip casting a single ceramic, coating and recasting with the second ceramic powder mix.

(C) Prepare a green composite tube by slip casting a zirconia-calcia tube followed by isostatic pressing an outer layer of thoria-yttria.

(D) By a process of co-extrusion produce a green composite tube. Fire to approximately 85% theoretical density.

It has thus been shown that the inventive composite ceramic electrolyte provides improved electrochemical properties whereby an effective means of measuring oxygen activity in liquid sodium can be carried out.

While particular embodiments of the invention have been illustrated and described, modifications will become apparent to those skilled in the art, and it is intended to cover in the appended claims all such modifications as come within the spirit and scope of the invention.

What we claim is:

1. Device for measuring oxygen activity in liquid sodium comprising: a composite solid ceramic electrolyte composed of a layer of zirconia-calcia bonded to a layer of thoria-yttria, and a high impedance voltmeter electrically connected across said composite electrolyte, said composite electrolyte being positioned such that only said layer of thoria-yttria is adapted to contact the liquid sodium, and a gaseous reference electrode is formed on the layer of zirconia-calcia.

2. The device defined in claim 1, wherein the composite solid ceramic electrolyte is formed in a closed end tube configuration with said layer of thoria-yttria located on the outer surface thereof.

3. The device defined in claim 1, wherein the composite solid ceramic electrolyte is formed in a plate configuration and secured within a support member such that only the layer of thoria-yttria is externally exposed.

4. The device defined in claim 3, wherein said support member comprises a metallic tube means, and at least said layer of thoria-yttria is secured thereto by a metal-ceramic seal means.

5. The device defined in claim 1, wherein said layer of zirconia-calcia is composed essentially of $ZrO_2$ and 9–15% CaO.

6. The device defined in claim 1, wherein said layer of thoria-yttria is composed essentially of $ThO_2$ and 7.5% $Y_2O_3$.

7. The device defined in claim 1, wherein each of said layers of said composite electrolyte is provided on at least a portion of the surface thereof facing away from the other layer with means insuring good electrical contact with said voltmeter.

References Cited

UNITED STATES PATENTS

| | | | |
|---|---|---|---|
| 3,468,780 | 9/1969 | Fischer | 204—195 S |
| 3,481,855 | 12/1969 | Kolodney et al. | 204—195 S |
| 3,645,875 | 2/1972 | Record et al. | 204—195 S |
| 3,575,718 | 4/1971 | Adlhart et al. | 136—86 F |

TA-HSUNG TUNG, Primary Examiner

U.S. Cl. X.R.

204—1 T